United States Patent [19]

Sniderman

[11] 4,385,304
[45] May 24, 1983

[54] STACKED DROP GENERATORS FOR PULSED INK JET PRINTING

[75] Inventor: Albert Sniderman, West Bloomfield, Mich.

[73] Assignee: Burroughs Corporation, Detroit, Mich.

[21] Appl. No.: 198,138

[22] PCT Filed: Jun. 12, 1980

[86] PCT No.: PCT/US80/00742
§ 371 Date: Aug. 8, 1980
§ 102(e) Date: Aug. 8, 1980

[87] PCT Pub. No.: WO81/00151
PCT Pub. Date: Jan. 22, 1981

Related U.S. Application Data

[63] Continuation-in-part of Ser. No. 55,969, Jul. 9, 1979, abandoned.

[51] Int. Cl.³ .............................................. G01D 15/18
[52] U.S. Cl. .................................. 346/140 R; 346/75
[58] Field of Search ........................... 346/75, 140 PD

[56] References Cited

U.S. PATENT DOCUMENTS 3,211,088 10/1965 Naiman ................. 346/149 PD UX
3,946,398  3/1976 Kyser et al. ...................... 346/75 X Primary Examiner—George H. Miller, Jr.
Attorney, Agent, or Firm—Edmund M. Chung; Kevin R. Peterson

[57] ABSTRACT

A stacked drop generator apparatus 20 for ink jet printing includes a stackable housing 22 of electrically nonconductive material having a cavity 24 containing fluid. A pressure wave is produced in the fluid by a device 26 which is deformed in response to electrical pulses. Each cavity 24 is flooded with fluid and has a nozzle 40 integral with the housing. The nozzle has an intake end 41 in the fluid cavity, an exit port 42 through which fluid is expelled from the housing. The cavity of the housing adjacent the nozzle has a tapered shape to concentrate the effect of the pressure wave on the fluid.

3 Claims, 12 Drawing Figures

INK SUPPLY

POSITIVE DIAPHRAM DEFORMATION

NEGATIVE DIAPHRAM DEFORMATION

4,385,304

STACKED DROP GENERATORS FOR PULSED INK JET PRINTING

This application is a continuation-in-part of Ser. No. 55,969, filed July 9, 1979, abandoned.

BACKGROUND OF THE INVENTION

1. Technical Field of the Invention

This invention relates to an improved stacked drop generator apparatus for ink jet printing.

2. Description of the Prior Art

Prior art generators for ink jet printing were bulky in size compared to the drop size produced. Consequently, the number of drop generators per printed character was physically limited. However, instead of decreasing the drop generator size to achieve closer spacing between ink drops, prior ink jet printers reduced the space between drops by increasing the size of the drop. As a result of the larger drop size, character definition and print quality are lessened.

Many ink jet printers have failed to successfully address the problem of fluid dribbling from the exit port once the jet has been energized to expel ink. The fluid, under static pressure in the ink reservoir and awaiting expulsion, was under no restraining force to inhibit leakage out the exit port.

The present invention promotes printed character definition and quality by utilizing the small size of the drop generator. More generators may be stacked to print each character. This feature permits a smaller drop size, better defined characters, and improved printing quality. In addition, the invention uses a deformable device to generate a pressure wave pulse through the printing fluid or ink. This wave expels a drop of fluid from a fluid filled cavity through an exit port. A reverse deformation of the device is then induced to withdraw the fluid at the exit port back into the fluid cavity. Consequently, an ink drop is generated and expelled on demand and ink dribbling from the exit port between drop generations is inhibited.

BRIEF SUMMARY OF THE INVENTION

A stackable drop generator for ink jet printing includes a stackable housing of electrically nonconductive material having a cavity containing fluid, an ink trough alignable with each housing for supplying the cavity with fluid, and holes which, when aligned, receive fastening devices for stacking multiple drop generators. In one form of the invention a piezoelectric ceramic driver is used to produce a pressure wave on the fluid and is located in the cavity of the housing. The driver is bidirectionally deformable in response to changing polarities of electrical pulses received from electrodes. These electrodes also have an ink trough and holes for receiving fastening devices which are alignable with the corresponding ink trough and holes in the housing when multiple drop generators are stacked. An end plate, having an ink supply well, is engageable with one end of a drop generator to store a volume of fluid. This fluid is fed to the ink trough of each housing in a stack of drop generators to flood each fluid cavity. An end plate without an ink well engages the opposite end of, and prevents fluid leakage from the drop generator.

In another form of the invention a bimorph driver is used to produce a pressure wave on the fluid. The bimorph is positioned outside the fluid cavity of the housing and acts on a diaphram wall of the housing.

To permit one electrode to transmit electrical pulses to two adjacent drivers, each driver is alternately poled with respect to its adjacent driver in an adjacent drop generator. Upon application of an electrical pulse to a driver, a positive or negative deformation of the driver is produced depending on the polarity of the pulse, and a corresponding pressure wave acts on the fluid of the cavity. In response to a positive driver deformation, a fluid drop of ink is expelled from the housing through a nozzle. This nozzle is integral with the housing and has an intake end in the cavity and forms an exit port from the housing for the ink drop. A negative driver deformation imparts a low pressure wave which withdraws the fluid into the cavity from the exit port of the nozzle to prevent dribbling of the fluid out of the nozzle. In addition to this negative deformation, the nozzle is composed of a nonwetting material, which inhibits fluid dribbling from the exit port.

DETAILED DESCRIPTION OF THE INVENTION

Figure 1:
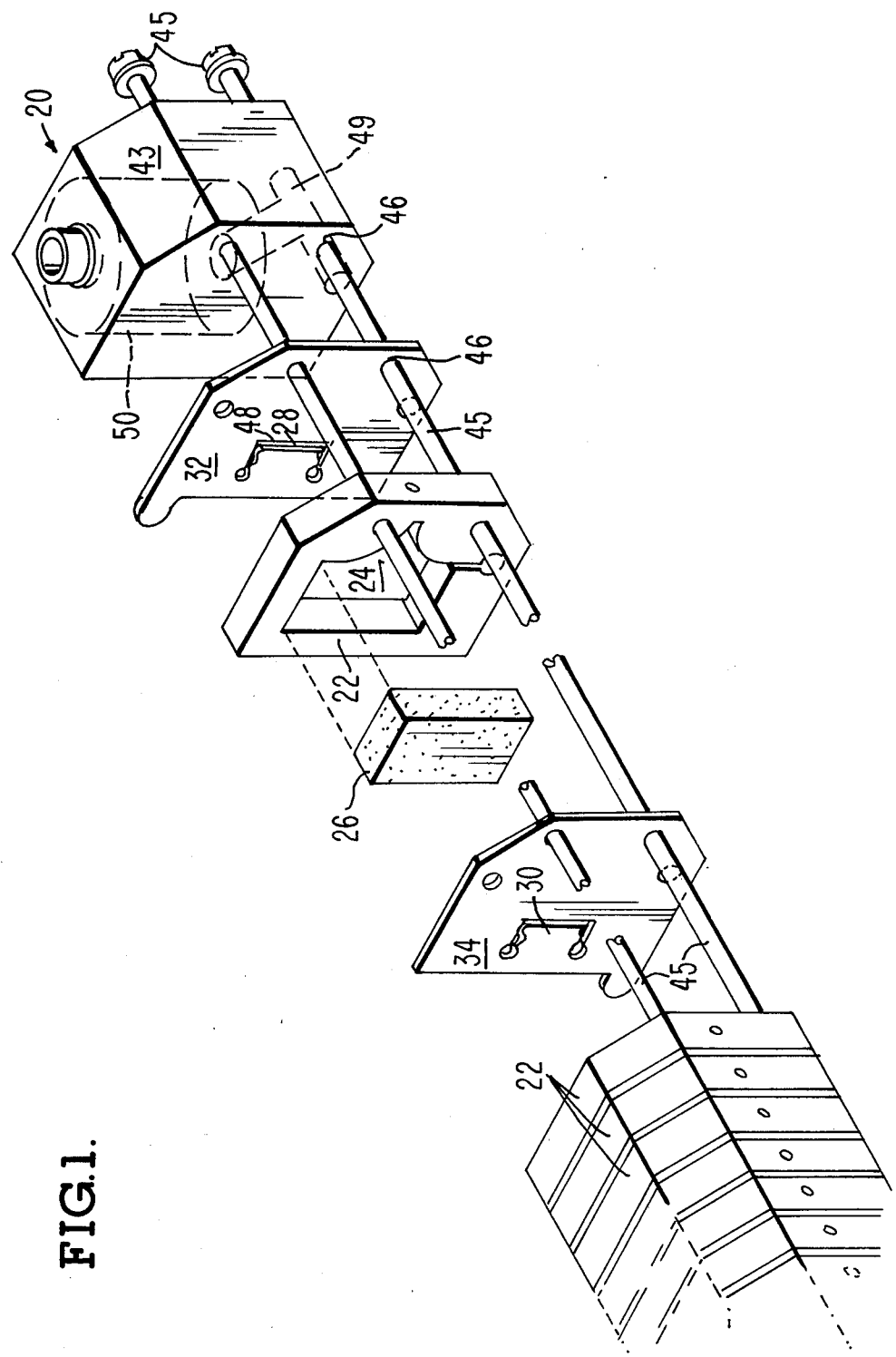
FIG. 1 is an exploded, isometric view of a drop generator apparatus embodying the present invention.
Figures 2, 2A, 2B:
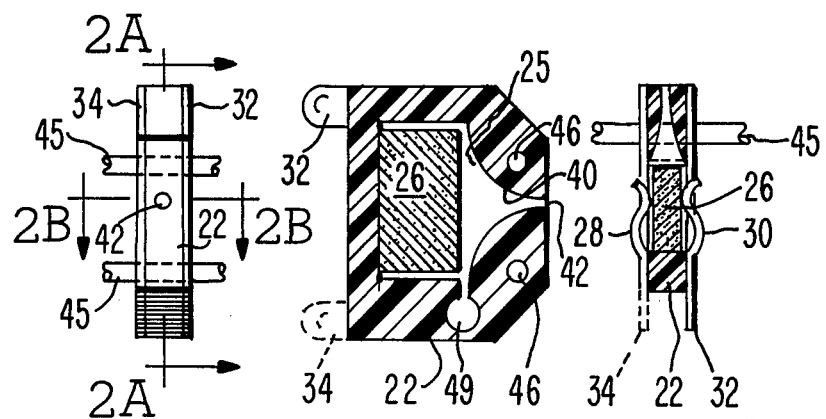
FIG. 2 is a front view of a drop generator with the fluid in a steady state position.
FIG. 2A is a sectional view of the drop generator in FIG. 2 taken along line 2A—2A.
FIG. 2B is a sectional view of the drop generator in FIG. 2 taken along line 2B—2B.
Figure 3:
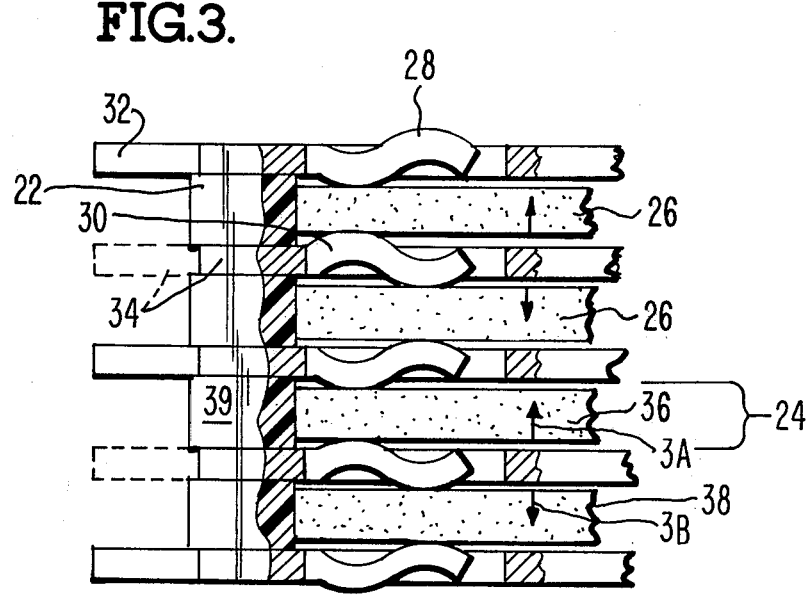
FIG. 3 is a sectional top view of several stacked drop generators of the type shown in FIG. 2.

Referring to FIG. 1, a drop generator apparatus 20 for ink jet printing includes a housing 22 of electrically nonconductive material enclosing a cavity 24 filled with printing fluid 25 (FIG. 2A). Insertable in cavity 24 for generating pressure waves in the fluid 25 is a driver 26 made of piezoelectric ceramic material which deforms in response to applied electrical pulses. The driver 26 is about 0.005 inch thick to allow the fluid drops to be closely spaced adjacent one another for good print definition. The driver 26 (FIG. 3) within cavity 24 is contacted on adjacent sides by spring contacts 28 and 30 in electrodes 32 and 34, respectively. Preferably, the electrodes 32 and 34 separate adjacent cavities 24 by about 0.003 inch. The driver 26 is secured to the rear of housing 22 by an adhesive or other suitable means. The orientation of the spring contacts allows each electrode to contact two drivers and transmit an electrical pulse of the same polarity to the adjacent sides 36 and 38 (FIG. 3) of two drivers 26. Therefore, alternate poling of drivers 26 in the directions of arrows 3A and 3B is implemented to permit a single electrode to contact two drivers 26. To prevent torquing of the drivers 26 due to electrical pulses being transmitted to drivers 26 through spring contacts 28 and 30, the spring contacts abut driver 26 at equal distances from the housing base 39. To provide a passage out of housing 22 for the ink fluid 25, a nozzle 40 (FIG. 2A), is integrally formed in housing 22, has an intake end 41 adjacent the cavity 24 and an exit port 42.

Figure 4:
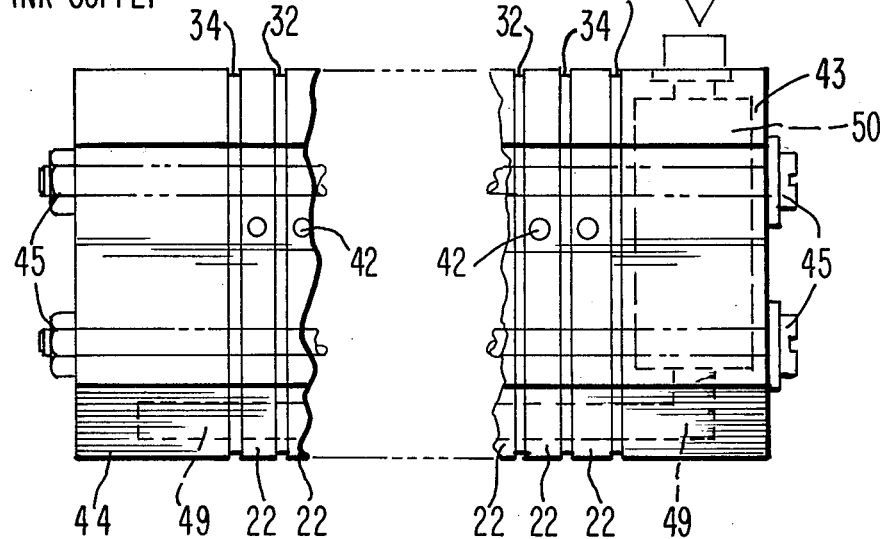
FIG. 4 is an assembled, front view of a stacked drop generator apparatus.

A complete drop generator apparatus 20 is sealed to prevent fluid leakage through spring apertures 48 by fastening end plates 43 and 44 (FIGS. 1 and 4) over the outside electrode 32 and electrode 34 respectively. The bolts 45 pass through the apertures 46 (FIG. 1) to secure the drop generator apparatus 20. An ink trough 49 (FIGS. 2A and 4) extends along the length of the stacked drop generator apparatus 20 due to matching holes in each electrode and housing to supply each cavity 24 with fluid. The trough 49 is fed by a volume of fluid stored in an ink supply well 50 located in end plate 43.

Figure 5:
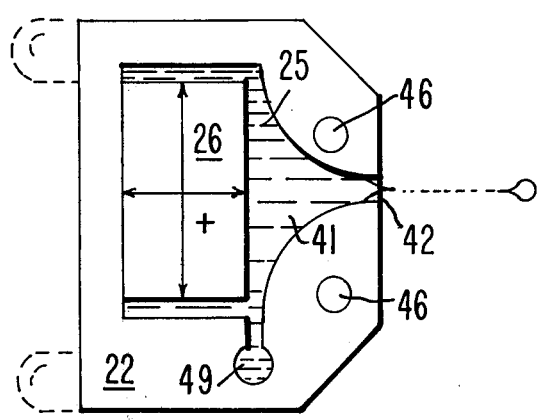
FIG. 5 depicts a drop generator with a driver deformed to expel an ink drop from the exit port of the nozzle.
Figure 6:
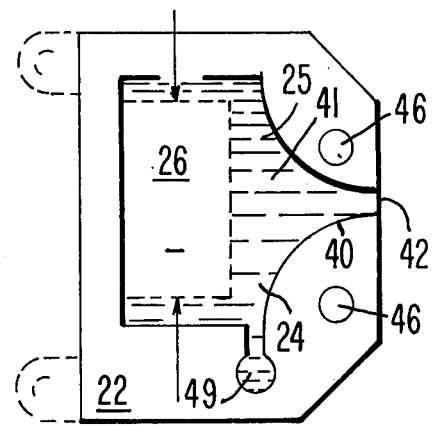
FIG. 6 depicts a drop generator with a driver deformed to withdraw ink from the exit port of the nozzle into the fluid cavity.
Figure 7:
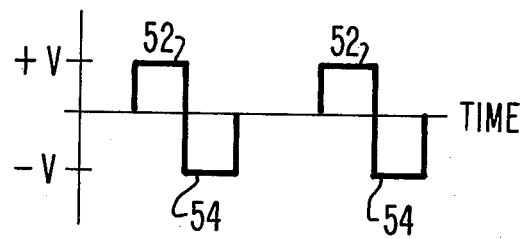
FIG. 7 illustrates representative electrical pulses to cause the driver of the drop generator to deform.

As shown in FIG. 5, a fluid drop is expelled on demand from a housing 22 by a positive deformation of driver 26. Electrodes 32 and 34 transmit a positive voltage pulse 52 illustrated in FIG. 7 through the spring contacts 28 and 30 of the electrodes to deform the piezoelectric ceramic driver orthogonally to the electrodes. The positive drive deformation illustrated in FIG. 5 produces a high pressure wave on the fluid 25 in the cavity 24. The wall of the cavity 24 adjacent the nozzle 40 has an exponential horn configuration and directs the pressure wave acting on the fluid 25 toward the nozzle 40. Following the positive voltage pulse 52, a negative voltage pulse 54 (FIG. 7) is applied to electrodes 32 and 34 which negatively deforms driver 26 as illustrated in FIG. 6 to produce a low pressure wave and withdraw the fluid at the exit port 42 of the nozzle 40 back toward the intake end of the nozzle.

The housing 22 is formed from a material which is non-wetting with respect to the fluid 25 being used for printing. The preferred material for the housing 22 is a flurocarbon resin, particularly polytetrafluroethylene (TEFLON) or in the alternative fluorinated ethylene propylene or fluorocarbon co-polymers. As a result, the fluid 25 forms a convex meniscus 56 positioned inside the exit port 42 of the nozzle 40, under steady state conditions. The non-wetting surface of the housing 22 causes the meniscus 56 of the fluid to remain inside the nozzle 40 and thus prevents fluid dribbling on the face of the housing. If the housing 22 is formed from a wetting material a concave meniscus would result and the fluid would be drawn out of the nozzle 40 by capillary action with resultant fluid dribbling. The action of the driver 26 under negative deformation produces a low pressure wave on the fluid 25 and withdraws the fluid back into the nozzle in order to quickly return the fluid to the steady state condition with the meniscus 56 inside the nozzle. This feature is a further aid to prevent fluid dribbling.

The meniscus 56 of fluid is positioned sufficiently inside the nozzle 40 that minor pressure variations in the fluid will not expel the fluid from the nozzle. However, the meniscus 56 is sufficiently close to the exit port 42 of the nozzle that the action of the driver 26 produce a high pressure wave will expel fluid from the exit port of the nozzle. The position of the meniscus can be varied by changing the shape of the cavity 24 adjacent the nozzle to constrict or enlarge the approach to the nozzle. Additionally, the position can be varied by changing the properties of the fluid 25 being used as a printing ink.

Figure 8A:
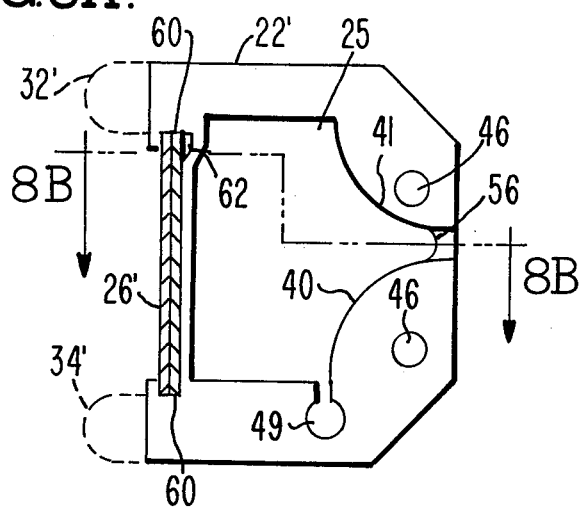
FIG. 8A is a side view of another type of drop generator embodying the present invention with the fluid in a steady state position.
Figure 8B:
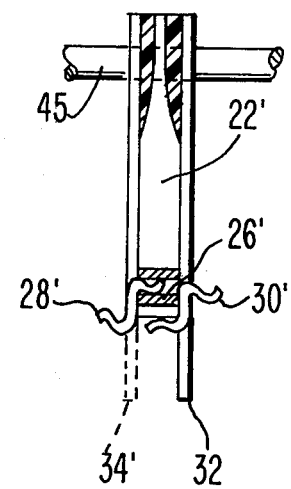
FIG. 8B is a sectional view of the drop generator taken along line 8B—8B with the addition of electrode 34'.
Figure 9:
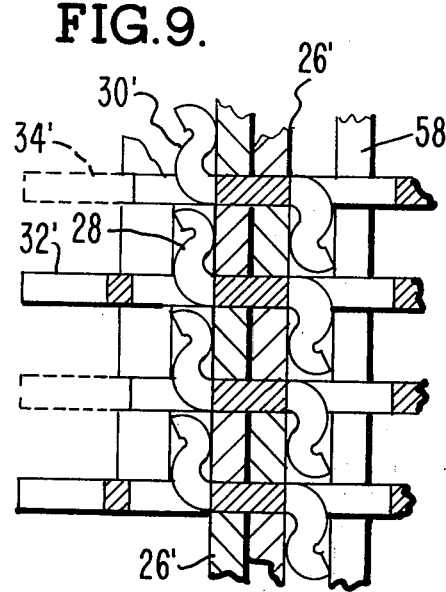
FIG. 9 is a sectional top view of several stacked drop generators of the type shown in FIG. 8A.

Another form of drop generator embodying the present invention is illustrated in FIGS. 8A, 8B and 9. In these figures the same numerals are used to identify unchanged elements while numerals with a prime superscript are used to identify modified elements. The modified drop generator utilizes a driver 26' which is positioned outside the cavity 25 on a diaphram wall 58 of the housing 22'. The driver 26' is retained in grooves 60 formed in the housing 22' and can be affixed with a suitable adhesive to the diaphram wall 58. The driver 26' is preferably a bimorph in order that large deflections can be achieved upon the application of positive and negative pulses.

The electrode 34' has a spring contact 28' which passes behind a convolution 62 in the diaphram wall 58 to engage the rear of the bimorph driver 26'. The electrode 32' has a spring contact 30' which engages the front of the bimorph driver 26'.

The operation of the bimorph driver 26' is similar to the operation of the piezoelectric driver 26. A positive voltage pulse is applied to the bimorph driver 26' causing the driver to bow and flex the diaphram wall 58 inward toward the nozzle 40 and expel fluid from the exit port 42. A negative pulse is then applied to the driver 26' causing the driver to bow in an opposite direction and flex the diaphram wall 58 outward away from the nozzle 40 and withdraw the fluid 25 into the cavity 24.

Thus, it can be seen that the bimorph driver 26' functions to expel and withdraw fluid through the noxxle 40 in a manner which is equivalent to the operation of the piezoelectric drive 26'. One advantage to the exterior positioning of the bimorph driver 26' is that the fluid 25 does not interact with the driver. Consequently, the properties of the fluid 25 can be chosen without regard to whether the particular fluid will interact either chemically or electrically with the driver.

FIG. 9 illustrates how the drop generators can be arranged so that the electrode 32' and the electrode 34' are able to contact a driver on either side of the electrode. The bimorph drivers 26' are positioned so that the polarity of adjacent drivers is opposite. This configuration achieves the same function as the arrangement of drop generators shown in FIG. 3.

To permit the use of more drop generators than available with the prior art, the individual drop generators forming the apparatus 20 have been made thin, stackable, and sequentially addressable to print a well defined, predetermined, quality character.

A stack of ten drop generators arranged in a vertical array can be movably mounted as a print head in a page printer and caused to traverse a page horizontally. Selective activation of the vertical array of drop generators as the print head traverses a horizontal page would result in characters being printed on the page. In another application of the present invention an array of three groups of ten drop generators can be used to form a three-line check or document endorser. In this application, the array of drop generators remains fixed while the check or document is moved past the array. In both applications, the array of drop generators functions as a dot matrix printer. Consequently, a wide variety of character fonts can be achieved and the array has graphics printing capability. The electronic control for a dot matrix printer is well known in the art and can be implemented by a person having ordinary skill in the art.

What is claimed is:

1. A stackable drop generator apparatus for ink jet printing comprising:
   a plurality of stackable housings of electrically nonconductive material each having a cavity for containing a fluid;
   means asociated with each housing and deformably responsive to a first change in polarities of electrical pulses, for producing a pressure wave in the fluid and responsive to a different change in polarities of electrical signals to establish a vacuum within said cavity;
   stackable means for transmitting electrical pulses to the deformably responsive means;
   means for flooding each cavity with fluid;
   a nozzel, integral with each housing, having an intake end in the fluid cavity and an exit port through which fluid is expelled from within the housing, the fluid cavity having a tapered portion associated with the nozzel to concentrate the pressure wave on the fluid; and
   wherein each stackable housing further comprises electrically nonconductive material having an ink trough and apertures, the ink trough being aligned with the ink trough of each other housing for supplying the respective cavity with fluid and the apertures being aligned with the apertures of each other housing to receive fastening means for stacking drop generators.

2. The invention of claim 1, wherein the means deformably responsive to changing polarities of electrical pulses comprises a piezoelectric ceramic driver; and wherein the piezoelectric ceramic driver is alternately poled with respect to its adjacent driver of an adjacent drop generator so that one electrode transmits the electrical pulses to two adjacent drivers.

3. The invention of claim 1, wherein the stackable means for transmitting electrical pulses to the deformably responsive means comprises electrodes having an ink trough and apertures, the ink trough being aligned with the ink trough of each housing and the apertures being aligned with the apertures of each housing to receive fastening means for stacking drop generators.

* * * * *